Patented Nov. 23, 1937

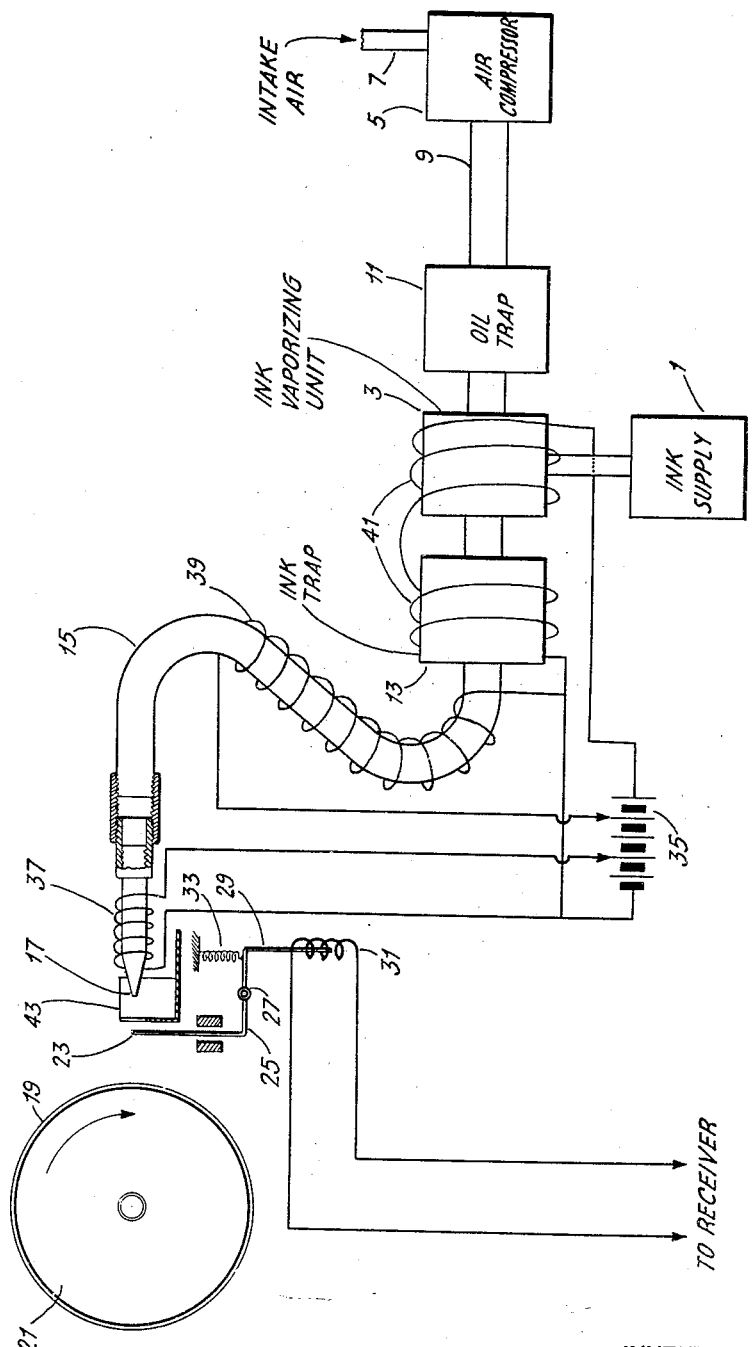

2,100,204

UNITED STATES PATENT OFFICE 2,100,204

FACSIMILE SYSTEM

Henry Shore, Elizabeth N. J., assignor to Radio Corporation of America, a corporation of Delaware Application June 3, 1933, Serial No. 674,147

1 Claim. (Cl. 178—96)

The present invention relates to facsimile systems and is directed both to a recording medium, such as an ink, by which the signaling indications may be permanently recorded, and to the system by which such recordings may be produced.

In the prior art attempts have frequently been made to provide a black ink as a recording fluid which can be easily vaporized and projected upon some suitable form of recording sheet in order to form a permanent record of received signaling impulses. However, in the prior art difficulties have always arisen because of the fact that whenever what was thought to be a black ink was vaporized and sprayed upon a record surface the result of the recorded image was not a true black reproduction but was one which varied between red and blue and, therefore, was apt to assume any color within the visible spectrum.

Also according to the prior art wherever inks for recording purposes were made from lamp black or suspended carbon, difficulties were encountered due to clogging of the jet from which the ink was projected toward the recording surface.

It is an object of the present invention, therefore both to provide an ink which overcomes the difficulties experienced in the prior art and to provide a system in which there may be a more accurate reproduction of a record by the use of a vaporized or sprayed ink stream than has heretofore been obtainable.

Other objects of the invention are to provide a recording fluid which can be easily formed and which when once formed may be maintained by suitable apparatus in a vaporous state for long time periods.

Other objects of the invention are to provide a system for transferring the produced vaporized ink to the record surface and to provide ways and means by which the vaporized ink may be prevented from clogging the projection jet or nozzle from which it is directed to the record surface.

Other objects of the invention are to provide a system for projecting a recording fluid, preferably in the form of an ink vapor, to a recording surface in such manner as to avoid splattering of the ink, inaccuracies of the reproduction and to assure sharp and accurate outlines.

Another object of the invention is to provide a recording ink which when once projected upon the paper or recording surface will be of a color which is more pleasing to look upon than the vividly colored inks at present used to produce picture records from transmitted electrical signals.

Still a further object of the invention is to provide a recording ink for facsimile systems and the like which is solvent in water.

According to the prior art, several systems for recording picture records or the like by fluids have already been suggested. Such recordings by fluids may be by way of a heated gaseous blast of air or some other substance or fluid suitably heated which is caused to influence a heat sensitive recording sheet under the control of received signaling impulses. Such control may be provided either by way of a shutter controlled from the received signals so as to limit the amount of recording fluid or vapor reaching the recording surface or may be provided by way of a signal controlled cold jet of recording fluid serving to dissipate the heated record medium and to prevent it from reaching the recording surface.

A further method of using a recording fluid has been suggested in the prior art and provides for the projection of a vaporized ink stream toward a recording medium in undiminished state and then to limit the amount of recording fluid which actually reaches the recording surface by way of some suitable signal controlled screening medium.

The present invention, however, overcomes all known difficulties found to exist in such apparatus of the prior art and provides a system by which an ink of peculiar characteristics can be vaporized and projected so as to mark a recording surface under the influence of received signals and provide clearness of picture, sharpness of outline, and accuracy of reproduction not heretofore attainable so far as is known by the present applicant.

These and many other objects of the invention will, of course, be apparent and at once suggest themselves to those skilled in the art to which this invention is directed by reading the following specification and claim in connection with the accompanying drawing wherein one form of apparatus for carrying out the operation of the system and for neutralizing a recording ink of the character herein disclosed has been set forth.

To accomplish the above mentioned results, the ink used in this process is formed with a dye which possesses the desired color so that when it is sprayed upon the recording sheet it will present a pleasing black appearance. Preferably the ink should have the qualities of the usual hectographic inks and be readily soluble in water, as well as capable of being vaporized readily and capable of maintaining the vaporous state under ordinary room temperature conditions. The last named quality is important, in order that excessive condensation of the vaporous ink stream may not take place within the system.

In accordance with the present invention, therefore, as a basis for forming an ink suitable for use in recording with apparatus of the type above described and defined, a basic dye is used as the base from which the solution is formed. This basic dye may, for example, be that dye known in the art as "Zapon Fast Black M" which is easily soluble in alcohol. This dye is normally of a very dark green color when sprayed.

If, now, to this basic dye preparation known generally as Zapon Black, a small amount of red dye is added, it can be seen that the resulting recording will be substantially black. Many dyes of this general qualification may be used, although red phenosafranin is extremely satisfactory. In preparing a dye of this general nature to form the ink the following is suggested as one of the formulae which may be used:

| | | |
|---|---|---|
| Zapon Black M | grams | 35 |
| Red phenosafranin | do | 1.30 |
| Methyl alcohol | cc | 1000 |
| Glycerine | do | 160 |

It is, of course, to be understood that the above suggested combination of elements is not to be regarded in any way as limited, but rather understood as merely one of a series which may be formed and that the specific proportions of the various ingredients may be changed within wide limits without affecting the operation.

To prepare an ink of this general type, the alcohol is heated until it boils gently and the Zapon Black M dyestuff base is slowly added and stirred vigorously. The phenosafranin is then added with continuous stirring. Last of all, the glycerine is added. The entire mixture is permitted to boil gently, after which the entire mixture is permitted to cool. In preparing an ink of this character it is important that the heating be done by way of an electric stove to keep the mixture away from all open flame in order to prevent explosions. The phenosafranin should be weighed out very carefully since excessive amounts of phenosafranin will produce in the ultimately recorded picture a reddish color rather than the black desired.

While it has been suggested in the preparation of this ink mixture to heating the alcohol and glycerine it should be understood that this is not necessary but is merely for the purpose of accelerating the rate at which the dyes dissolve.

After the ink solution has been mixed in accordance with the above suggested method the ink is placed in an ink supply unit 1 which is connected by any suitable form of connection to an ink vaporizing unit 3. A vaporizing unit for use with this system may, for example, be of the general type disclosed in United States patent to Ranger #1,841,452 and embody a type of vaporizing unit known in the art as the DeVilbiss. To produce a vaporized ink stream there is provided an air compressor unit 5 having an air intake member 7 and an outlet 9 which directs the air through an air trap 11 to the ink vaporizing unit 3 where the ink is vaporized in well known manner. The vaporized ink is directed through the ink trap 13 which collects excessive ink particles. The ink vapor stream which passes through the ink trap 13 then passes through a tubular connection 15 to the jet 17 from which it is projected toward the recording surface 19 carried upon a record drum or the like 21.

Interposed between the ink jet 17 and the record drum 21 there is provided a shutter-like arrangement 23 which may be, for example, of the general type disclosed in United States patent to Ranger #1,765,448. This shutter is connected with an arm 25 provided at a point 27 and the opposite end of the arm 25 connects with an actuating armature 29 which is subjected to the influence of a magnetic field produced in the coil 31 by virtue of signals received in a receiver mechanism (not shown). The shutter 23 may be held open in the absence of received signals by the use of a spring member 33 against which the field of the actuating coil 31 operates to raise the diaphragm or shutter member 23 to various positions with respect to the open in the jet or nozzle 17 from which the vaporized ink is projected. Thus, in accordance with received signals the shutter 23 is operated and vibrates so as to permit the ink vapor projected from the ink jet 17 to reach the paper surface 19 in amounts which produce a resultant picture image.

The operation of the apparatus of the picture carrying drum 21 is substantially like that disclosed in the United States patent to Ranger #1,841,452.

In order to prevent condensation of the ink vapor stream within the system several conditions normally tending to cause condensation must be taken into account. In the first place, when the vapor chamber 3 is filled with ink vapor each impulse of air from the air compressor 5 momentarily increases the pressure in the ink vaporizing unit. This sudden pressure rise normally causes condensation with a resultant decrease in the vapor density. In the second place, the ink vapor must travel over a relatively long path from the vaporizing unit to reach the jet or nozzle 17 from which it is projected toward the record surface 19. Since the temperature of the tube 15 is below that at which the vapor may exist, considerable condensation will be precipitated upon the walls of this tube. As a third condition, when the vapor escapes from the nozzle 17 the sudden reduction of pressure accompanied by expansion produces a considerable lowering in the temperature which in many instances has been found to be as much as 20°. As a result, considerable vapor is condensed and hangs upon the lips of the nozzle. Eventually the resultant droplet becomes so large that it breaks away and the vapor stream flowing past it carries it to the recording surface where it splatters. To overcome these difficulties it can be seen that any arrangement which tends to help the solvent maintain its vaporous condition will enable the use of higher pressures and consequently greater density of the ink vapor.

One method for preventing these conditions is to use higher temperatures throughout the system to maintain the vapor. To provide for this condition heat is applied at three or more or less independent points in the recording system. These points may be at the ink vaporizing unit 3 and the associated ink trap 13, over the tubular section 15 by which the ink vapor is conveyed from the ink trap to the recording nozzle, and at the recording nozzle itself. To provide for this heating effect a battery 35 connects to suitable heating coils 37, 39, and 41 connected respectively to the ink nozzle 17, the tubular connection 15 and to the ink vaporizing and ink trap units 3 and 13 respectively. The heating units may consist of resistance wire suitably wound around the various elements and then suitably wrapped or insulated externally in a manner well known in the art and therefore not specifically illustrated because of the desire to present the disclosure in slightly clearer form.

If the tip of the nozzle 17 is supported by a metallic connection to the same support member which holds the remaining elements, it is always necessary to heat the nozzle in view of the conduction effects. This is especially true where the shutter and nozzle are coated with a high melting wax which will not be wetted by alcohol or glycerine. Such a substance may be, for example, beeswax, for this reduces the surface tension between the solvent and the surface so that any condensate at the nozzle is reduced with a consequent reduction in splattering.

It is important, also, that the shutter 23 be formed substantially straight and free from bends in order to help to dispose of any surplus liquid which will then collect in a supporting tray conventionally shown and designated as 43.

Various other modifications and changes may be made to the arrangement herein shown and disclosed without departing from the spirit and scope of the invention and, therefore, I believe myself to be entitled to make and use any and all of these modifications which fall fairly within the spirit and scope of the hereinafter appended claim.

Having thus described the invention, what is claimed and desired to secure by Letters Patent is the following:—

In a system for recording signals, a recording fluid supply, means for vaporizing the recording fluid, means for maintaining the vaporized fluid in a heated state, means for continuously projecting constant amounts of the vaporized fluid toward a recording surface, and an electromagnetic shutter for controlling the amount of vaporized fluid reaching the surface upon which recordings are to be made in accordance with the representations desired upon the recording surface.

HENRY SHORE.